US012547132B2

(12) United States Patent
Ozadowicz et al.

(10) Patent No.: US 12,547,132 B2
(45) Date of Patent: Feb. 10, 2026

(54) INFRASTRUCTURE MANAGEMENT SYSTEM

(71) Applicant: iSMA CONTROLLI Poland S.A., Warsaw (PL)

(72) Inventors: Andrzej Ozadowicz, Cracow (PL); Mateusz Klatecki, Gdansk (PL); Marcin Ploski, Dzialdowo (PL); Miloslaw Wróblewski, Gdansk (PL); Mariusz Jastrzebski, Wroclaw (PL); Pawel Kakol, Gdansk (PL); Tomasz Bal, Gdansk (PL)

(73) Assignee: iSMA CONTROLLI Poland S.A., Warsaw (PL)

( * ) Notice: Subject to any disclaimer, the term of this patent is extended or adjusted under 35 U.S.C. 154(b) by 898 days.

(21) Appl. No.: 17/808,198

(22) Filed: Jun. 22, 2022

(65) Prior Publication Data

US 2023/0418248 A1    Dec. 28, 2023

(51) Int. Cl.
 *G05B 15/02* (2006.01)
 *G06F 9/451* (2018.01)
 *G06F 9/455* (2018.01)

(52) U.S. Cl.
 CPC ............. *G05B 15/02* (2013.01); *G06F 9/451* (2018.02); *G06F 9/45558* (2013.01); *G06F 2009/45579* (2013.01)

(58) Field of Classification Search
 CPC ..... G05B 15/02; G06F 9/451; G06F 9/45558; H04L 69/08; H04L 69/18
 See application file for complete search history.

(56) References Cited

U.S. PATENT DOCUMENTS

| | | | |
|---|---|---|---|
| 10,129,046 B1* | 11/2018 | Casilli | H04L 12/2809 |
| 10,176,005 B2* | 1/2019 | Silva | G06F 9/45558 |
| 11,057,244 B2* | 7/2021 | Schubert | H04L 12/2832 |
| 11,194,302 B2 | 12/2021 | Krishnamurthy et al. | |
| 12,181,861 B2* | 12/2024 | Beckhoff | G05B 19/4183 |
| 2020/0125053 A1* | 4/2020 | Park | G06F 16/288 |
| 2021/0294634 A1* | 9/2021 | Chastain | G06F 9/50 |
| 2021/0389968 A1* | 12/2021 | Majewski | G06F 9/541 |
| 2023/0418248 A1* | 12/2023 | Ozadowicz | H04L 69/08 |

OTHER PUBLICATIONS

International Search Report and Written Opininon for PCT application PCT/IB2023/056232 dated Oct. 9, 2023.

* cited by examiner

*Primary Examiner* — Patrick H Mackey
(74) *Attorney, Agent, or Firm* — HONIGMAN LLP

(57) ABSTRACT

A method includes, for each respective infrastructure element of a plurality of infrastructure elements, controlling a feature of a facility environment using a set of parameters. The method further includes receiving, at a virtual machine, a request from a remote device using a first protocol and including a communication for a first infrastructure element of the plurality of infrastructure elements. The method includes generating, by the virtual machine, a translated request using a second protocol and transmitting the translated request to the first infrastructure element. The method includes receiving, at the virtual machine, from the first infrastructure element, an infrastructure element response using the second protocol and generating a translated response using the first protocol based on the infrastructure element response. The method includes transmitting, by the virtual machine, to the remote device, the translated response using the first protocol.

26 Claims, 8 Drawing Sheets

INFRASTRUCTURE MANAGEMENT SYSTEM

TECHNICAL FIELD

This disclosure relates to building management systems for managing and automating utilities and infrastructure elements within a building environment.

BACKGROUND

It is known to provide a control for monitoring and managing individual infrastructure elements present in a building environment. However, infrastructure elements often use different protocols and thus are incompatible with one another and/or a central control. The increasing sophistication and availability of connectable devices in accordance with the internet of things (IoT) paradigm has driven demand for a universal and comprehensive management system for dynamic and precise monitoring, control, and capture of data from all control devices present in a given environment.

SUMMARY

One aspect of the disclosure provides a computer-implemented method that when executed by data processing hardware causes the data processing hardware to perform operations. The operations include, for each respective infrastructure element of a plurality of infrastructure elements, obtaining a set of parameters defining control of a corresponding feature of a facility environment and controlling, using the set of parameters, the corresponding feature of the facility environment. The operations further include receiving, at a virtual machine, a remote device request from a remote device. The remote device request uses a first protocol and includes a communication for a first infrastructure element of the plurality of infrastructure elements. The communication is associated with control of a first feature of the facility environment corresponding to the first infrastructure element. Additionally, the operations include generating, by the virtual machine, a translated request using a second protocol. The translated request is based on the remote device request. Furthermore, the operations include transmitting, by the virtual machine, the translated request using the second protocol to the first infrastructure element. Also, the operations include receiving, at the virtual machine, from the first infrastructure element, an infrastructure element response using the second protocol. Further, the operations include generating, by the virtual machine, a translated response using the first protocol. The translated response is based on the infrastructure element response. Moreover, the operations include transmitting, by the virtual machine, to the remote device, the translated response using the first protocol.

Implementations of the disclosure may include one or more of the following optional features. In some implementations, the communication for the first infrastructure element includes instructions for the first infrastructure element to adjust control of the first feature of the facility environment based on a second set of parameters. In those implementations, the infrastructure element response includes confirmation that the first infrastructure element has adjusted control of the first feature of the facility environment based on the second set of parameters.

In some embodiments, the communication for the first infrastructure element includes an information request requesting information associated with control of the first feature of the facility environment. In those embodiments, the infrastructure element response comprises an information response providing the requested information.

In some implementations, a sensor is in communication with the first infrastructure element. In those implementations, controlling the first feature of the facility environment is based on sensor data received at the first infrastructure element from the sensor. In further implementations, the communication for the first infrastructure element includes an information request requesting information associated with control of the first feature of the facility environment. In those further implementations, generating the translated response is based on the sensor data received at the first infrastructure element.

In some embodiments, generating the translated response includes applying a tag to the infrastructure element response.

In some examples, the virtual machine includes a first virtual machine in communication with the first infrastructure element and a second virtual machine in communication with a second infrastructure element of the plurality of infrastructure elements. In those examples, the operations further include receiving, at the second virtual machine, a second remote device request from the remote device. The second remote device request uses the first protocol and includes a second communication for the second infrastructure element. The second communication is associated with control of a second feature of the facility environment corresponding to the second infrastructure element. In those examples, the operations also include generating, by the second virtual machine, a second translated request using a third protocol. The translated request is based on the second remote device request. In those examples, the operations include transmitting, by the second virtual machine, the second translated request using the third protocol to the second infrastructure element. Furthermore, in those examples, the operations include receiving, at the second virtual machine, from the second infrastructure element, a second infrastructure element response using the third protocol. Additionally, in those examples, the operations include generating, by the second virtual machine, a second translated response using the first protocol. The second translated response is based on the second infrastructure element response. Moreover, in those examples, the operations include transmitting, by the second virtual machine, to the remote device, the second translated response using the first protocol. In further examples, the second communication associated with control of the second feature of the facility environment includes instructions to control, by the second infrastructure element, the second feature of the facility environment based on control, by the first infrastructure element, of the first feature of the facility environment.

In some implementations, the remote device includes a remote server in wireless communication with each respective infrastructure element of the plurality of infrastructure elements.

In some embodiments, the remote device includes a user interface and the remote device request is generated at the remote device based on a user input received at the user interface.

In some examples, the data processing hardware includes a plurality of microcontrollers. Each respective microcontroller of the plurality of microcontrollers corresponds to a respective infrastructure element of the plurality of infrastructure elements. In further examples, the virtual machine operates on at least one microcontroller of the plurality of microcontrollers.

In some implementations, the virtual machine comprises a portion of a system controller. The system controller is operated on the data processing hardware and source code for the system controller is stored on memory hardware in communication with the data processing hardware.

Another aspect of the disclosure provides an infrastructure management system. The infrastructure management system includes data processing hardware and memory hardware in communication with the data processing hardware. The memory hardware stores instructions that, when executed on the data processing hardware, cause the data processing hardware to perform operations. The operations include, for each respective infrastructure element of a plurality of infrastructure elements, obtaining a set of parameters defining control of a corresponding feature of a facility environment and controlling, using the set of parameters, the corresponding feature of the facility environment. The operations further include receiving, at a virtual machine, a remote device request from a remote device. The remote device request uses a first protocol and includes a communication for a first infrastructure element of the plurality of infrastructure elements. The communication is associated with control of a first feature of the facility environment corresponding to the first infrastructure element. Additionally, the operations include generating, by the virtual machine, a translated request using a second protocol. The translated request is based on the remote device request. Furthermore, the operations include transmitting, by the virtual machine, the translated request using the second protocol to the first infrastructure element. Also, the operations include receiving, at the virtual machine, from the first infrastructure element, an infrastructure element response using the second protocol. Further, the operations include generating, by the virtual machine, a translated response using the first protocol. The translated response is based on the infrastructure element response. Moreover, the operations include transmitting, by the virtual machine, to the remote device, the translated response using the first protocol.

Implementations of the disclosure may include one or more of the following optional features. In some implementations, the communication for the first infrastructure element includes instructions for the first infrastructure element to adjust control of the first feature of the facility environment based on a second set of parameters. In those implementations, the infrastructure element response includes confirmation that the first infrastructure element has adjusted control of the first feature of the facility environment based on the second set of parameters.

In some embodiments, the communication for the first infrastructure element includes an information request requesting information associated with control of the first feature of the facility environment. In those embodiments, the infrastructure element response comprises an information response providing the requested information.

In some implementations, a sensor is in communication with the first infrastructure element. In those implementations, controlling the first feature of the facility environment is based on sensor data received at the first infrastructure element from the sensor. In further implementations, the communication for the first infrastructure element includes an information request requesting information associated with control of the first feature of the facility environment.

In those further implementations, generating the translated response is based on the sensor data received at the first infrastructure element.

In some embodiments, generating the translated response includes applying a tag to the infrastructure element response.

In some examples, the virtual machine includes a first virtual machine in communication with the first infrastructure element and a second virtual machine in communication with a second infrastructure element of the plurality of infrastructure elements. In those examples, the operations further include receiving, at the second virtual machine, a second remote device request from the remote device. The second remote device request uses the first protocol and includes a second communication for the second infrastructure element. The second communication is associated with control of a second feature of the facility environment corresponding to the second infrastructure element. In those examples, the operations also include generating, by the second virtual machine, a second translated request using a third protocol. The translated request is based on the second remote device request. In those examples, the operations include transmitting, by the second virtual machine, the second translated request using the third protocol to the second infrastructure element. Furthermore, in those examples, the operations include receiving, at the second virtual machine, from the second infrastructure element, a second infrastructure element response using the third protocol. Additionally, in those examples, the operations include generating, by the second virtual machine, a second translated response using the first protocol. The second translated response is based on the second infrastructure element response. Moreover, in those examples, the operations include transmitting, by the second virtual machine, to the remote device, the second translated response using the first protocol. In further examples, the second communication associated with control of the second feature of the facility environment includes instructions to control, by the second infrastructure element, the second feature of the facility environment based on control, by the first infrastructure element, of the first feature of the facility environment.

In some implementations, the remote device includes a remote server in wireless communication with each respective infrastructure element of the plurality of infrastructure elements.

In some embodiments, the remote device includes a user interface and the remote device request is generated at the remote device based on a user input received at the user interface.

In some examples, the data processing hardware includes a plurality of microcontrollers. Each respective microcontroller of the plurality of microcontrollers corresponds to a respective infrastructure element of the plurality of infrastructure elements. In further examples, the virtual machine operates on at least one microcontroller of the plurality of microcontrollers.

In some implementations, the virtual machine comprises a portion of a system controller. The system controller is operated on the data processing hardware and source code for the system controller is stored on the memory hardware.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
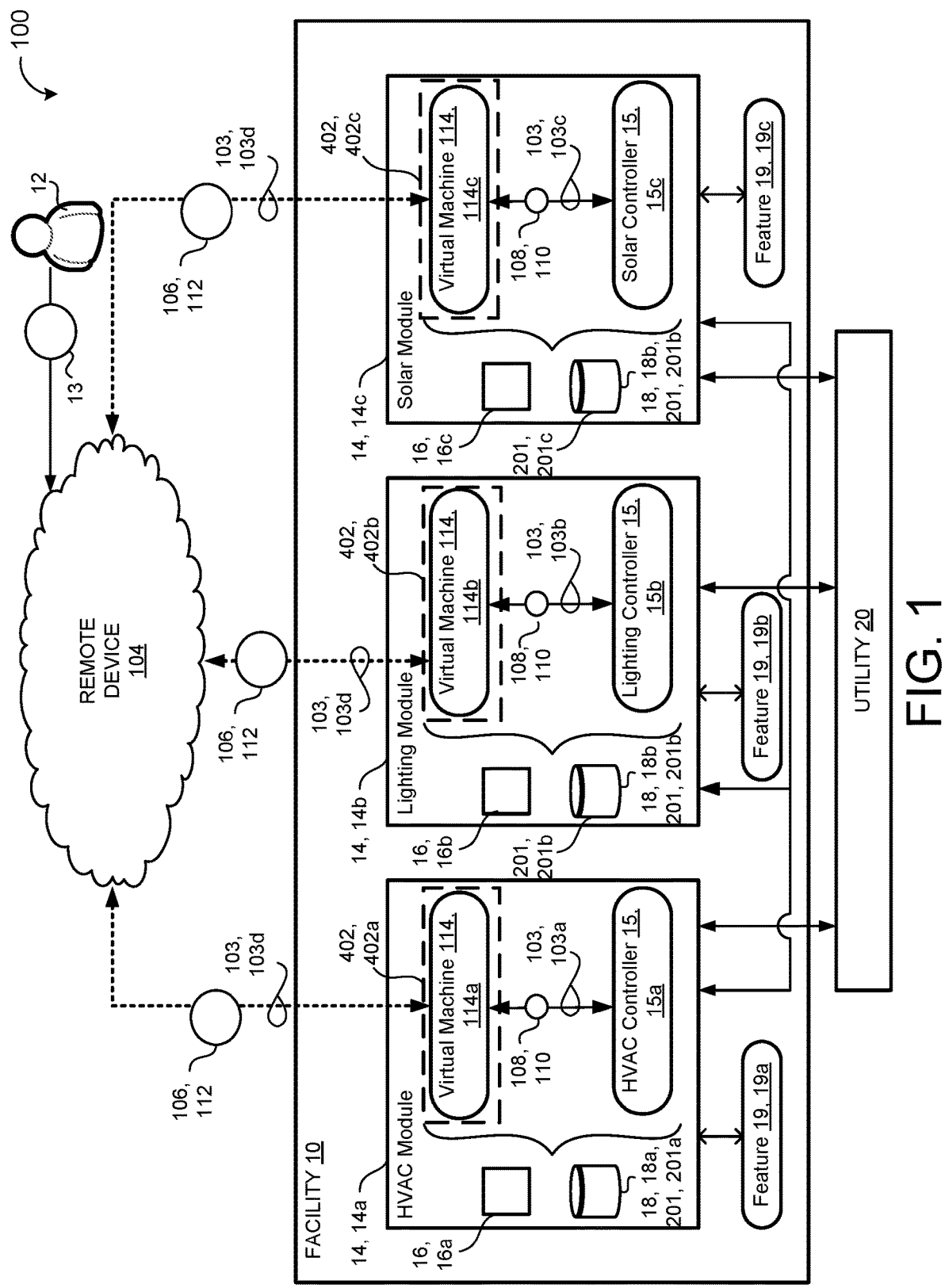
FIG. 1 is a schematic view of an infrastructure management system integrated with infrastructure elements present in a facility environment.

Networked building automation systems or infrastructure management systems or building management systems (BMS) communicatively connect various distributed network devices (i.e., building or utility or infrastructure elements) present in a building facility or infrastructure environment so that the distributed devices may be controlled, managed, and automated from a central control system. For example, distributed devices may include a heating, ventilation, and air-conditioning (HVAC) system, a security system, a power grid, lighting systems, and the like. Each distributed device may include a control or network I/O node that controls or manages or enables a function of the infrastructure environment provided by the distributed device. In the example of the HVAC system, the control may manage airflow and temperature of airflow to portions of the infrastructure environment responsive to, for example, user instructions or outputs from temperature sensors in the environment. The networked system facilitates control and interconnectivity of individual distributed devices via communication with the controls of the distributed devices. However, the distributed devices in a given infrastructure environment may not be compatible with one another and/or not compatible with a common control system because, for example, the devices and control system may operate using different communication protocols. As discussed below, implementations herein enable universal communication and control of distributed devices using a BMS, such as a nanoEDGE platform, operating across multiple distributed devices across the infrastructure environment. While implementations herein may refer specifically to the nanoEDGE system or platform, it should be understood that the present system is not limited to the nanoEDGE system or platform. The BMS includes a BMS controller that operates at data processing hardware of an infrastructure element controlling a feature of a facility environment. The BMS controller operates a virtual machine at the infrastructure element to enable interaction between a user and the BMS and allow for real time programming of the infrastructure element via processing of user commands at the virtual machine during operation of the infrastructure element.

Typical building and home automation systems are limited in their compatibility with distributed devices (i.e., infrastructure elements) based on, for example, lack of common protocols for controlling all devices present in an environment and a finite ability to adjust or update control of the devices. Thus, available systems are limited in which devices the system may connect with and in the precision with which the system may control connected devices.

For example, traditional centralized and distributed home and building automation systems are focused on providing high-level comfort for users in the rooms of buildings and automation of the control functions of building infrastructure elements. Traditional technologies and solutions are based on specific dedicated communication protocols, processors, and PLC class controllers offered by specific manufacturers, thus making compatibility across components difficult. For instance, three different open standards, KNX, LonWorks, and BACnet, are commonly available in the building automation market.

Connectivity of infrastructure elements in an environment using traditional technologies requires the use of specialized, dedicated software platforms and integration tools that operate with technical parameters related to, for example, physical and logical addressing of controllers and distributed automation modules and complicated parameterization of control and monitoring functions. Building automation systems using such technologies require parameterization and tuning adequate to accommodate changing circumstances, subsystems, and usable space organization of the building environment. Based on the traditional technical system solutions available, installation and management of such systems requires specialty qualification and experience in how to select proper devices, functions, and parameters. Additionally, the relatively high costs of equipment (e.g., drivers, I/O modules, network infrastructure, and installation services of qualified, specialized integrators) provide a barrier to integration of building automation solutions. Even though many individual infrastructure elements are based on relatively cheap microcontrollers, they are usually programmed and commissioned during a dedicated integration procedure of the entire system, without the possibility of dynamic programming in real-time. Traditional systems enabling more dynamic management of BMS functionality and components are built based on computer systems with processors having adequate RAM, memory resources, and high computing power for data processing. In other words, automation systems that provide for dynamic control of infrastructure elements are based on sophisticated processing systems that may be difficult to control and integrate within a facility environment.

Furthermore, the development of microelectronics and the evolution of internet-based communication technologies have resulted in significant conceptual changes in technical solutions for networked home and building automation systems. Particularly, infrastructure elements with built-in communication modules for wired communication, such as communication on local area networks (LAN), and wireless communication, such as via Wi-Fi networks, have appeared on the market in accordance with the Internet of Things (IoT) paradigm. They allow for communication of information and data between the controlled devices, controllers, and internet services. Automation devices can also remotely transmit information about the operating status of controlled devices, and thus users can monitor the operating status through internet services and applications. In other words, a wider range of distributed devices have connectivity capabilities, but relatively few infrastructure elements are readily compatible for connection with one another or with a central controller. Improvements to infrastructure elements, such as those brought on by IoT technologies, contribute to the increased demand for BMS platforms. Centralizing control of distributed devices with IoT capabilities and expanding the compatibility of devices with centralized control provides for more precise and complete control over an infrastructure environment.

Modern buildings are also equipped with new infrastructure elements, such as renewable energy sources (RES), heat pumps, and charging stations for electric vehicles. Thus, infrastructure environments may operate as producer-consumers, where the environment may vary between drawing utilities (e.g., electricity) from the consumer grid and contributing utilities to the consumer grid. This provides a challenge for building automation systems and BMS platforms to effectively manage controllers and other peripheral devices to optimize energy consumption in buildings or local microgrids and may be important across all areas of application (e.g., industrial, commercial, residential, etc.). Furthermore, new paradigms related to energy-efficient and energy-passive buildings (i.e., near zero energy usage) are influencing the growing importance of the issue of utility consumption throughout the life cycle of a building. The growing trend for states to create regulations aimed at increasing the energy efficiency and management of buildings, as well as the increasing awareness of users of building spaces in the field of safety and security, comfort, and environmental considerations, strongly affect the increase in demand for reliable, cost-effective, and easy-to-implement BMS platforms.

Moreover, improved safety of people and devices in building environments drives demand for integration of building automation systems and BMS platforms. For example, technical service systems (i.e., systems that may require the expertise of trained technicians for control, repairs and maintenance), such as HVAC, lighting, and local energy generation and storage systems may be significantly supported by the BMS platform to ensure interoperability and the ability to remotely operate devices, collect and process data in cloud systems, organize advanced control scenarios as well as dynamically respond to changing conditions and operating parameters of building infrastructure elements.

The BMS platform (e.g., the nanoEDGE platform) discussed below is capable of connecting and controlling infrastructure elements that operate using different protocols from one another and the BMS may be easily integrated with new and different infrastructure elements throughout the life of the facility environment. In other words, the BMS may accommodate new infrastructure elements (i.e., newly installed within the facility environment) and newly developed infrastructure elements (i.e., technologies that do not yet exist). The BMS allows for sophisticated control of infrastructure elements that may both draw and contribute to the utility grid.

Maintenance of the BMS and control of the infrastructure elements via the BMS is simplified and thus does not require sophisticated setup and parameterization. That is, the provided BMS platform is equipped with advanced optimization tools for the integrated management of building automation. The optimization tools ensure easy programming of control and monitoring functions, quick and safe access to system installations, and the ability to automate procedures of selecting data points to provide necessary data from automation devices, along with the binding and combining of the optimization tools with the optimal logic structures of the BMS platform functions. Users thus receive a solution tailored both to the specifics of their work and the constantly changing requirements and conditions of operating in modern, intelligent buildings.

Referring now to FIG. 1, a building management system (BMS) 100 (e.g., a nanoEDGE platform) controls one or more features 19, 19a-n of a facility environment 10. The facility environment 10 may include any suitable building or campus of buildings and/or outdoor areas having one or more infrastructure elements 14, 14a-n. For example, the facility environment 10 may be a factory, a warehouse, a laboratory, a retail store, a residential home, an apartment complex, and the like. In the illustrated embodiment, the facility 10 includes infrastructure elements 14 of an HVAC system 14a, a lighting system 14b, and a solar energy unit 14c. The infrastructure elements 14 are not limited to those shown in the illustrated embodiment and the BMS 100 may be integrated with and control operation of any number and variety of infrastructure elements 14 (i.e., any element that contributes to the control and/or management of the facility environment 10).

Each infrastructure element 14 operates to control a feature 19 of the facility environment 10. For example, the HVAC system 14a may operate to control a feature 19a that includes the temperature, humidity, and airflow in various regions of the facility environment 10. The lighting system may operate to control a feature 19b that includes the interior and exterior lighting of the facility environment 10. The solar energy unit 14c may control a feature 19c that includes a series of solar panels exterior the facility that capture solar energy and the solar energy unit 14c may control such features 19 as direction angle of the solar panels or the flow of captured solar energy to and from the facility. The infrastructure elements 14 may be in communication with one or more utility grids 20 (e.g., a consumer energy grid) and the infrastructure elements 14 may each draw and/or contribute to the utility grid 20. Each infrastructure element 14 includes a respective infrastructure element controller 15, 15a-n that controls the given feature 19 of the environment 10. Thus, the HVAC system 14a may include an HVAC controller 15a, the lighting system 14b may include a lighting controller 15b, and the solar energy system 14c may include a solar energy controller 15c. The controllers 15 may control operation of the respective features 19 according to a respective set of parameters. For example, the controller 15a of the HVAC system 14a may control the feature 19a including temperature, humidity, and airflow according to a set of parameters defining when or how or where to operate the HVAC system 14a for controlling the feature 19a. The controllers 15 may operate or execute on data processing hardware of the infrastructure element 14, such as respective microcontroller units (MCU) 16, 16a-n using, for example, storage elements 18, 18a-n (i.e., nonvolatile memory accessible by the MCUs 16) and the controllers 15 may retrieve or obtain the respective set of parameters from the respective storage elements 18. The controllers 15 may be manufactured and programmed by the original manufacturer of the infrastructure element 14.

Further, each infrastructure element 14 may be configured to communicate using respective protocol 103, 103a-n (e.g., Modbus, BACnet, etc.) and the respective protocols 103 of the individual infrastructure elements 14 may not be compatible with the exchange of information between individual infrastructure elements 14 or a user 12. That is, each infrastructure element 14 may use a protocol 103 that is different than protocols 103 used by other infrastructure elements 14 and/or different than a protocol 103 used by the remote device 104. For example, the HVAC system 14*a* may use a first protocol 103*a*, the lighting system 14*b* may use a second protocol 103*b*, and the solar energy system 14*c* may use a third protocol 103*c*.

As will be discussed further below, the BMS 100 allows a user 12, such as a facility administrator, resident, maintenance personnel, or virtual user such as a facility management service, to connect to the infrastructure elements 14 present in the facility environment 10 to, for example, adjust control, capture data, automate, and/or monitor operation of the infrastructure elements 14 from a common, central, and/or remote location. The BMS 100 may communicate with the individual infrastructure elements 14 according to the native communication protocol 103 or standard of the respective infrastructure element 14. Thus, integration of any number of infrastructure elements 14 may be possible without the need to reprogram infrastructure elements 14 according to a common or shared protocol 103. The BMS 100 also allows for easy integration of new infrastructure elements 14 (i.e., newly installed or updated) and maintenance of existing infrastructure elements 14 without interrupting operation within the facility environment 10.

The infrastructure elements 14 may include any suitable processing or computing devices. For example, the BMS 100 may be tailored specifically for integration with one or more MCUs of an infrastructure element 14 or any other suitable processing hardware of the infrastructure element 14 or in communication with the infrastructure element 14. That is, the infrastructure elements 14 compatible for control with the BMS 100 may be existing infrastructure elements 14 within the facility environment 10 as the requirements for integration with the BMS 100 are minimal. For example, in the illustrated example, the infrastructure elements 14 each include respective MCUs 16, 16*a-c*. The MCUs 16 may be the existing or original MCUs for the respective infrastructure element 14. That is, the data processing hardware of the infrastructure element 14 may be utilized to provide compatibility of the infrastructure element 14 with the BMS 100. Thus, and as will be discussed below, even if a given infrastructure element 14 is not compatible for communication with other infrastructure elements 14 or a central system (i.e., the elements and central system do not use a common or shared protocol 103), the BMS 100 may nevertheless utilize the data processing hardware 16 of the infrastructure element 14 to provide central connectivity. The BMS 100 may operate at least partially on the MCU 16 of the infrastructure element 14 to extend functionality of the BMS 100 to the infrastructure element 14. Thus, the MCU 16 of the infrastructure element 14 may operate both the respective controller 15 of the infrastructure element 14, but also a module of the BMS 100 to enable connectivity.

The BMS 100 may include one or more fieldbus level controllers or BMS controllers 402 (e.g., a nanoEDGE controller) in communication with the infrastructure elements 14. In the illustrated embodiment, the BMS controllers 402 include respective virtual machines (VM) 114*a-c* at the respective MCUs 16 of the infrastructure elements 14 and the VM 114 processes instructions to enable performance of the BMS controller 402 while the infrastructure element MCUs 16 operate to control their respective function of the facility environment 10. Optionally, the BMS controller 402 may operate on a fieldbus level controller 402 in communication with a plurality of infrastructure elements 14, portions of infrastructure elements 14, or components in communication with infrastructure elements 14, such as sensors, human machine interfaces (HMI), and the like. The one or more VMs 114 may each communicate with the user 12 (e.g., via a user device such as a laptop, desktop, mobile phone, and the like) for accessing control of the infrastructure elements 14.

The user 12 may communicate with the infrastructure elements 14 in any suitable manner, such as via a user interface executed by a user device disposed within the facility environment 10 or a web based service executing on a server located on-premises or remotely through a network (e.g., in the cloud). In the illustrated embodiment, the BMS 100 receives communications from a remote device 104. The user 12 provides inputs at the remote device 104 and the remote device 104 generates communications for the BMS 100 based on the user inputs.

The BMS 100 may enable communication between the user 12 and the infrastructure elements 14 by translating communications (e.g., commands, requests, and/or any other data.) between protocols 103 used by the remote device 104 and protocols 103 used by the respective infrastructure elements 14 for which the communication is intended. This translation may occur at the BMS controller 402 operating on the MCU 16 of the infrastructure element 14 so that communication may be received and processed at the infrastructure element 14 while the infrastructure element 14 is operational and without requiring any changes to the controllers 15 (e.g., new or altered programming). Communications (such as to update operation of the infrastructure element 14 or fulfill a request of the communication) between the user 12 and the infrastructure elements 14 may thus occur seamlessly without interruption of operation of the infrastructure element 14. For example, each respective BMS controller 402 may operate a respective VM 114 to receive and provide any processing or translation necessitated by the communication between the user (e.g., user device) and the infrastructure element 14.

Thus, for example, a user 12 may provide a user input 13 to a remote device 104 (e.g., via a mouse, keyboard, touch interface, voice interface, etc.). The remote device 104 generates a remote device request 106 (or other communication) based on the user input 13 and communicates the remote device request 106 to the BMS controller 402 (i.e., the VM 114) associated with the infrastructure element 14 intended to receive the remote device request 106. In the example of FIG. 1, the remote device 104 uses a fourth protocol 103*d* (that may be the same or different than any of the protocols 103*a-c*) to communicate the remote device request 106.

The remote device request 106 is received at the respective VM 114 of the infrastructure element 14 the user is communicating with. The VM 114, in some examples, generates a translated request 108 based on the received remote device request 106. The translated request 108 uses the protocol 103 that is compatible with the infrastructure element 14 intended to receive the communication. Here, in the example of the HVAC system 14*a*, the remote device request 106 uses the fourth protocol 103*d* and the translated request uses the first protocol 103*a*. Thus, the VM 114 is capable of receiving communications in a first protocol 103 and transmitting the communications using a second protocol 103. Thus, the translated request 108 is transmitted to the controller 15 of the infrastructure element 14 using a protocol 103 compatible with the controller 15.

In some implementations, the VM 114 receives, from the controller 15 of the infrastructure element 14, an infrastructure element response 110 in response to the translated request 108. The infrastructure element response 110 uses the native protocol 103 of the infrastructure element controller 15. The VM 114, based on the infrastructure element response 110, optionally generates a translated response 112 using the protocol 103 of the remote device 104 and transmits the translated response 112 to the remote device 104 using the protocol 103 of the remote device (i.e., the protocol 103d in this example).

The remote device 104 may be in communication with any number of nanoEDGE controllers or BMS controllers 402 (i.e., VMs 114) associated with any number of infrastructure elements 14 such that the infrastructure elements 14 (which may use any given protocol 103) may communicate with the user 12 and/or with one another via the nanoEDGE platform or BMS 100. For example, the remote device 104 may communicate with a remote server in wireless communication with each infrastructure element 14 present in an infrastructure environment 10. Optionally the remote server may communicate with infrastructure elements 14 present in multiple different infrastructure environments 10.

Further, the communication generated with or by the remote device request 106, in some examples, triggers or solicits a given response from the infrastructure element 14. For example, the infrastructure element 14 may operate to control the feature 19 of the facility environment 10 according to a set of parameters and the communication may include instructions for the infrastructure element 14 to adjust control of the feature 19 of the facility environment 10 based on a new or adjusted set of parameters. Thus, the response 110 from the infrastructure element 14 may confirm the adjustment to the new set of parameters. According to another example, the communication for the receiving infrastructure element 14 may originate at another infrastructure element 14 and may include instructions for the receiving infrastructure element 14 to control the respective feature 19 of the facility environment 10 based on the control by the sending infrastructure element 14 of its feature 19 of the facility environment.

In a further example, the communication 108 transmitted to the infrastructure element 14 may request information associated with control of the feature 19 of the facility environment 10, such as requesting a list of entries to the facility 10 from a security system. The response 110 from the infrastructure element 14 may thus provide the requested information. Additionally, if the operation of the infrastructure element 14 is based on inputs from a sensor, the response 110 from the infrastructure element 14 may be based on the sensor data received at the infrastructure element 14 from the sensor.

Figure 2:
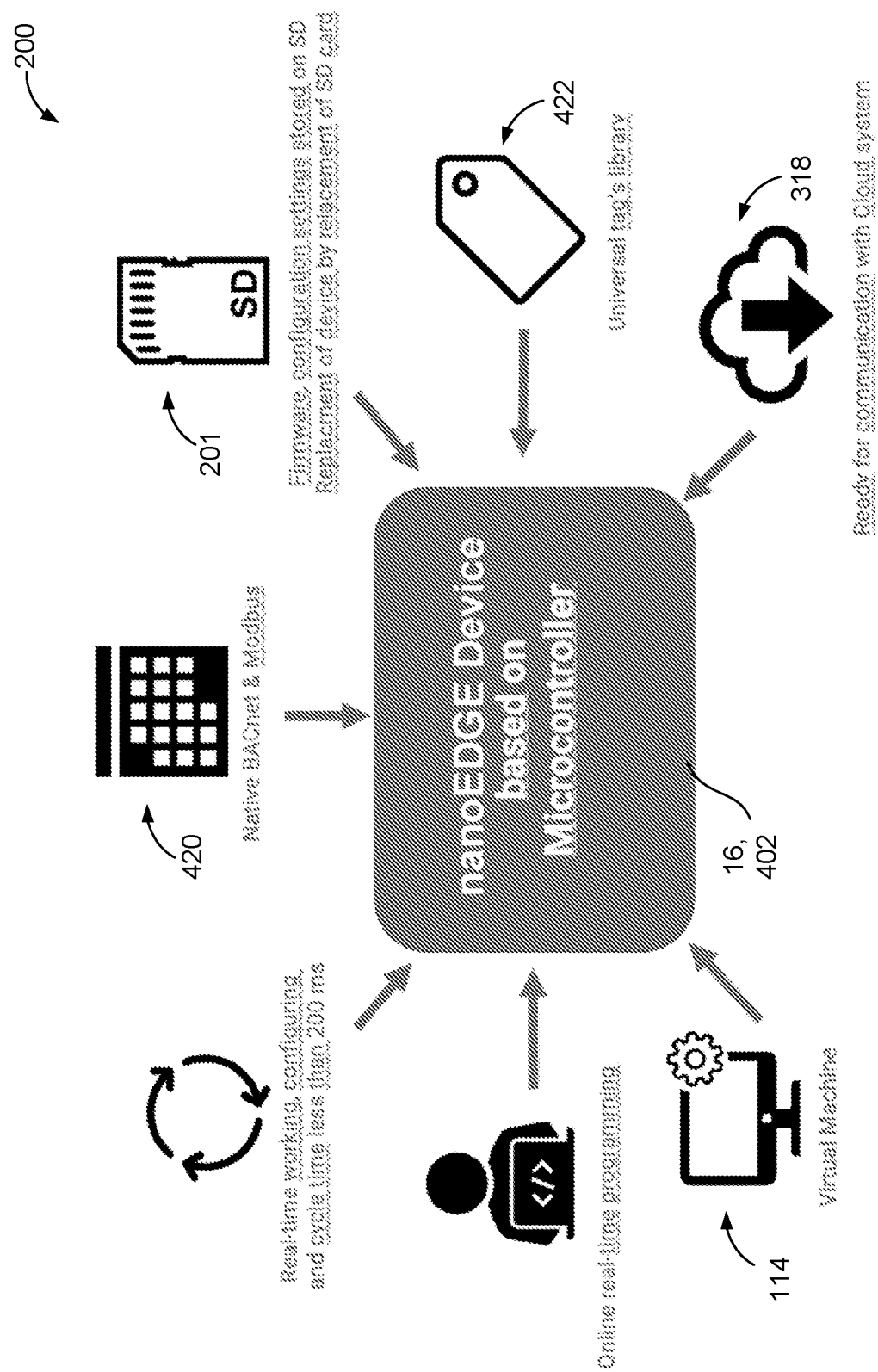
FIG. 2 is a schematic view of modules of an infrastructure management system controller operating on a microcontroller of an infrastructure element.
Figure 3:
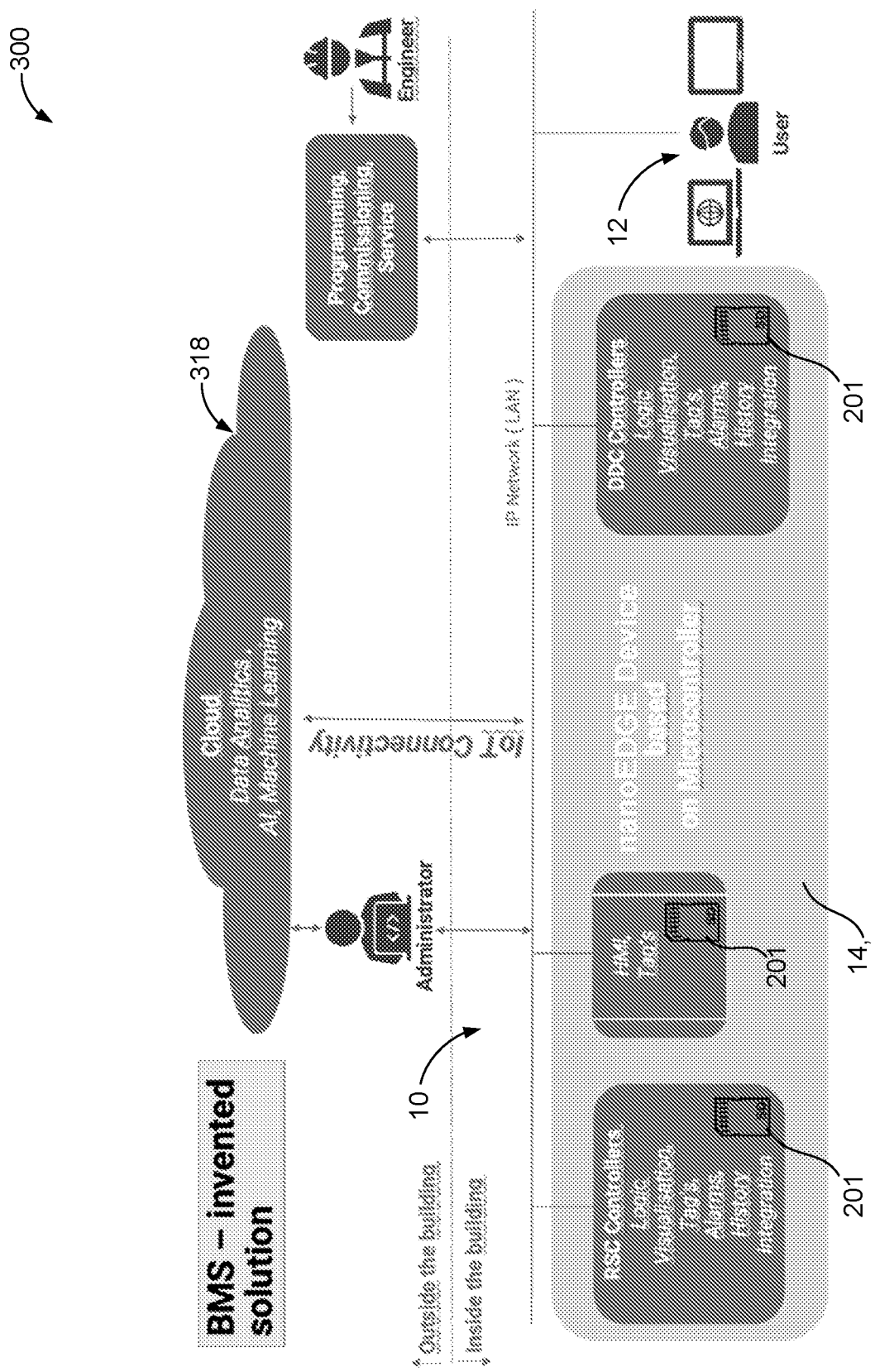
FIGS. 3 and 4 are additional schematic views of the infrastructure management system operating on the microcontroller of the infrastructure element.

As shown in FIGS. 2 and 3, the BMS controller 402 (e.g., the nanoEDGE controller) operates at the MCU 16 of the infrastructure element 14 (e.g., the BMS controller 402 is tailored specifically for integration with one or more MCUs of the infrastructure element 14) using a virtual machine (VM) environment 114. FIG. 2 depicts a chart 200 showing the modules and capabilities of the BMS controller 402, as discussed in more detail below. FIG. 3 depicts a chart 300 of exemplary connections of modules of the BMS controller 402 with infrastructure elements 14 within the facility environment 10. The MCU 16 of the infrastructure element 14 may have limited RAM memory resources and/or processing power and the VM 114 allows for a portion of the processing resources of the infrastructure element 14 to be used to perform operations while another portion of the processing resources continue operating the infrastructure element 14 to control the function of the facility environment 10. That is, the VM 114 enables processing at the infrastructure element 14, such as for reprogramming or reparameterization of the infrastructure element 14, while operation of the infrastructure element 14 is ongoing.

For example, the VM 114 processes communications at the infrastructure element 14 for translating the communications between protocols 103, the VM 114 adjusts parameters for use by the controller 15 of the infrastructure element 14, and the VM 114 enables bounding of the parameters used by the controller 15 to operate the feature 19 of the environment 10 to data and other conditions in the environment 10. In other words, an infrastructure element 14 may traditionally be limited to operating under set parameters or may be limited in the data or signals it can receive from the environment 10 (such as limited to only receiving signals from sensors and other infrastructure elements using the same protocol 103). In the example of the HVAC system 14a, the controller 15a may be initially programmed to only operate the HVAC system 14a responsive to temperature or humidity sensors present in the environment 10. The VM 114a may adjust the parameters at the controller 15a to allow the HVAC system 14a to also operate responsive to an occupancy sensor present in the environment 10, the occupancy sensor using a protocol 103 different from the HVAC system 14a and the parameters used by the controller 15a not previously programmed to operate responsive to occupancy in the environment 10. The VM 114a may thus adjust the parameters of the controller 15a to be responsive to not only sensor data using a non-native protocol 103, but also including a newly introduced parameter. Thus, the controller 15 may be reparameterized by the VM 114 based on, for example, operation of other infrastructure elements 14, sensors present but not connected to the infrastructure element 14, and other features of the infrastructure environment 10.

The VM 114 provides an easy way to implement basic as well as advanced control and monitoring functions directly at the MCU 16 of the infrastructure element 14 with flexibility and elasticity both for engineers and integrators. Thus, applications, algorithms, and/or functions for operation of the infrastructure element 14 may be dynamically programmed and changed on the fly while the infrastructure element 14 is running. Thus, the BMS 100 enables management of microcontroller-based nodes to optimize energy and other resources while maximizing comfort for facility and building users. The management of the infrastructure elements 14 is realized in a different manner than traditional automation systems because the VM 114 enables reprogramming of control algorithms directly at the MCU 16 in real time. This enables dynamic adaptation of the infrastructure elements 14 to variable conditions and provides the possibility to send new settings and parameters directly to the controller 15 and upload control and monitoring functions without interrupting operation of the infrastructure element 14.

Put another way, the VM 114 may be installed directly on the infrastructure element 14 (i.e., executed by the MCU 16 of the infrastructure element 14) and the VM 114 provides device-specific implementation of the control provided from the user 12 or another system responsible for control of the facility environment 10. The VM 114 is able to translate communications to use the device-specific protocols 103 of the infrastructure element 14. Translating the control communications at the VM 114 (i.e., at the device level) instead of, for example, at the user system 12 or facility-wide level reduces resource usage at the user or environment level and increases the accuracy of the translation at the device 14 (i.e., the infrastructure element 14).

The VM 114 enables online and real-time programming of the infrastructure element 14 without interrupting operation of the infrastructure element 14. This allows for non-invasive, local and remote management of the infrastructure element controllers 15, modernization of control algorithms, as well as data and function visualization, without the need to stop and restart the given controller 15. The modification procedure is thus practically unnoticeable to users present in the facility environment 10 and thus easy to carry out.

Operating the fieldbus level controllers or BMS controllers 402 and VM 114 directly on the data processing hardware 16 of the infrastructure elements 14 provides built-in native support for functional profiles and network data points directly at the MCU level for common communication protocols 103, such as BACnet and Modbus. Implementing the BMS controller 402 at the fieldbus level (i.e., integrated with the control signals of the infrastructure elements) eliminates or reduces the need for complicated architectures based on advanced processors and peripheral components (e.g., memory storage, dedicated communication interfaces, etc.) that traditional automation networks require. Further, energy efficiency of the nodes' architecture is improved as well and the fieldbus level controllers 402 provide flexibility and openness within the BMS 100 with the option of building data points as native. In other words, the ability to build network variables themselves and their interrelations in the system, ready to be connected to BMS systems 100 without the need for human programming.

With respect to the example of translating communications from the user 12 between a protocol 103 used by the remote device 104 and the protocols 103 used by the infrastructure elements 14 (FIG. 1), the translation may occur at the VM 114 of the BMS controller 402 operating on the MCU 16 of the respective infrastructure element 14. Thus, the BMS 100 may utilize the processing resources 16 of the infrastructure element 14 to translate a communication that the infrastructure element 14 would otherwise be unable to receive into the native protocol 103 of the infrastructure element 14. Additionally, the BMS controller 402 may receive data from the infrastructure element 14 using the native protocol 103 of the infrastructure element 14 and process the data at the VM 114 to enable communication of the data to the user 12 or other infrastructure elements 14.

Beyond compatibility with native protocols 103 of the infrastructure elements 14, implementing the BMS controller 402 (e.g., the nanoEDGE platform) at IoT compatible infrastructure elements 14 provides for connection of the BMS controller 402 to the cloud. The IoT enables easy integration of controllers 15 for various categories of building infrastructure devices 14, as well as transferring data from these devices 14 to data platforms, where the data may be stored, analysed, and used to manage connected devices. The IoT uses, for example, the Internet Protocol (IP), along with encryption options, to exchange and analyse data as well as to optimize device performance. It is a complimentary addition to the data transmission networks within the BMS 100 and cooperates at the infrastructure device level with fieldbus protocols 103 such as Modbus or BACnet.

Moreover, the BMS controller 402 may be in communication with a tag library or tagging module 422 and the tag module 422 may allow the VM 114 to process data at the infrastructure element 14 for applying tags to the data for easier analysis and accumulation of data across the facility environment 10. Thus, communications from the BMS controller 402 or infrastructure element 14 may include sensed, received, or compiled data and its associated tags. That is, tags allow for unified naming and descriptions of data points with their network variables. Tagged data points can easily and reliably be used in communication with other infrastructure elements 14 or the user 12. For example, the tagged data can more easily be collected and used by artificial intelligence (AI) systems in communication with (and optionally in control of) the BMS 100. Thus, the BMS 100 may provide direct data collection from the infrastructure elements 14 for basic and advanced data analysis (and optionally AI).

The source code or firmware code (i.e., instructions stored in memory hardware 201 in communication with the data processing hardware 16 of the one or more infrastructure elements 14) may be installed on virtually any infrastructure element 14. For example, and as discussed in more detail below, the firmware code may be stored on a machine-readable storage device such as a Secure Digital (SD) memory card 201 (or other portable storage mediums), and uploaded to the MCU 16. Then, the firmware may connect to the user or remote device 104 for receiving future instruction, control, commands, etc. Thus, this may reduce the complexity of installation as the firmware need only be installed, it does not require complicated processes to connect the microcontroller 16 to the user 12 or environment controller 15. Additionally, this makes maintenance easier as a user 12 may need only to re-install the firmware via the SD card 201. All other updates may be provided wirelessly. An SD card 201 may be installed at each infrastructure element 14 for uploading firmware directly to the MCU 16 of each infrastructure element 14. Thus, the HVAC system 14a may receive an SD card 201a, the lighting system 14b may receive an SD card 201b, and the solar energy system 14c may receive an SD card 201c. Optionally, the firmware, via the SD card 201, may be uploaded at a data processing hardware 16 having controllers 15 for multiple infrastructure elements 14.

The BMS controller 402 and VM 114 may be configured according to the given infrastructure element 14 at which it is operating. VM technologies dedicated to IoT devices are constantly changing and developing. Therefore, the selection of a VM 114 for a specific MCU-based infrastructure element 14 is an important element of its implementation. Memory requirements, portability, availability of source codes, and compatibility with the company knowledge base may all be considered. For example, the MCU 16 of a given infrastructure element 14 may have limited memory resources (such as up to 1 MB) and yet the VM 114 executing at such an infrastructure element 14 may have the potential to execute a program loop (up to 1,000 blocks) cyclically in a short period of time (up to 200 ms). Thus, the BMS controller 402 may control fast processes in a building 10 (e.g., light control) with relatively small resource requirements.

The BMS controller 402, including code for operating the VM 114 and any infrastructure element-specific configurations may be stored on memory hardware 201 in communication with the data processing hardware 16 of the infrastructure elements 14. For example, the BMS controller 402 may be stored on a respective Secure Digital (SD) memory card 201 or any suitable interchangeable memory component 201, connected to each infrastructure element 14. Thus, the BMS controller 402 may be installed on any range of infrastructure elements 14 of varying complexity. Optionally, the BMS controller 402 may be uploaded to the data processing hardware 16 of the infrastructure element 14 from a remote server (such as the remote device 104) for subsequent operation of the BMS controller 402 on the infrastructure element 14. Quick replacement or maintenance of a non-functional BMS controller 402 may be realized by replacement of the SD card 201 at the infrastructure device 14 or by restoring or updating the controller 402 from the cloud 418. Thus, repair and maintenance for a system 100 does not require specialist engineering knowledge and can be performed by technicians. Additionally, the commissioning and integration of a new infrastructure element 14 can be performed quickly by the user 12.

As shown in FIG. 3, the facility environment 10 includes at least one infrastructure element 14 and the infrastructure element 14 includes an MCU 16 in communication with a SD card 201. The SD card 201 stores instructions for operating the BMS controller 402 on the MCU 16. For example, the BMS controller 402 here is operable to have one or more subcontrollers 360, 360a-b, including a room solution controller (RSC) 360, 360a (e.g., a first nanoEDGE controller or subcontroller) and a direct digital controller (DDC) 360, 360b (e.g., a second nanoEDGE controller or subcontroller). The subcontrollers 360 may be dedicated to building the BMS platform 100 at the one or more infrastructure elements 14 within the environment 10. In the illustrated embodiment, the BMS controller 402 provides RSCs, DDCs, and a human machine interface (HMI). The RSCs, DDCs, and HMI are connectable (such as individually connectable), via an IP network, such as a local area network (LAN), and the BMS controller 402 enables communication between the controllers and HMI over the LAN. Further, the user 12 is in communication with the BMS 100 over the LAN.

The user 12 may control operation of the infrastructure elements 14 via communication over the LAN with the BMS 100 and the BMS controller 402, such as via processing at the VM 114, may adjust the control of the infrastructure elements 14 without interrupting operation of the infrastructure elements 14. For example, control of the feature 19 of the environment (i.e., operation of the infrastructure element 14 at the control 15) may be based on or according to a set of parameters. In the example of the HVAC system 14a, the set of parameters may define temperatures for different portions or zones of the facility environment 10 at different times throughout the day. The HVAC system 14a may receive signals from temperature sensors that measure the ambient temperature within the respective zones and thus adjust operation of the HVAC system 14a to meet the set of parameters during operation. The user 12 may adjust the set of parameters, such as by redefining the temperature zones, adjusting the timing of temperature changes, and the like, and the VM 114 may process inputs 13 from the user 12 to define a second set of parameters based on the user inputs 13. The VM 114 may then, responsive to generating the second set of parameters, transmit the second set of parameters to the MCU 16 to adjust control of the HVAC system 14a according to the second set of parameters. The VM 114 may subsequently capture and/or process data related to operation of the HVAC system 14a to confirm operation of the HVAC system 14a according to the second set of parameters and transmit a response 112 to the user 12 confirming that the change has been implemented.

The BMS 100 may, via internet connectivity of one or more of the infrastructure devices 14, communicate (e.g., transmit data and receive instructions) outside of the facility environment 10, such as with an authorized facility administrator or a cloud-based system 318. The cloud-based system 318 may receive collected data from the BMS controller 402, such as for processing the collected data and communicating instructions to the BMS 100 to optimize control of the infrastructure devices 14 according to the processed data. For example, the cloud-based system 318 may operate according to data analytics algorithms, AI, and/or machine learning. That is, the cloud-based system 318 provides external data acquisition and processing server services for the BMS 100. The cloud-based system 318 also provides remote data access, such as visualization, trend analysis, remote adjustments, and control parameterization for the infrastructure elements 14.

Figure 4:
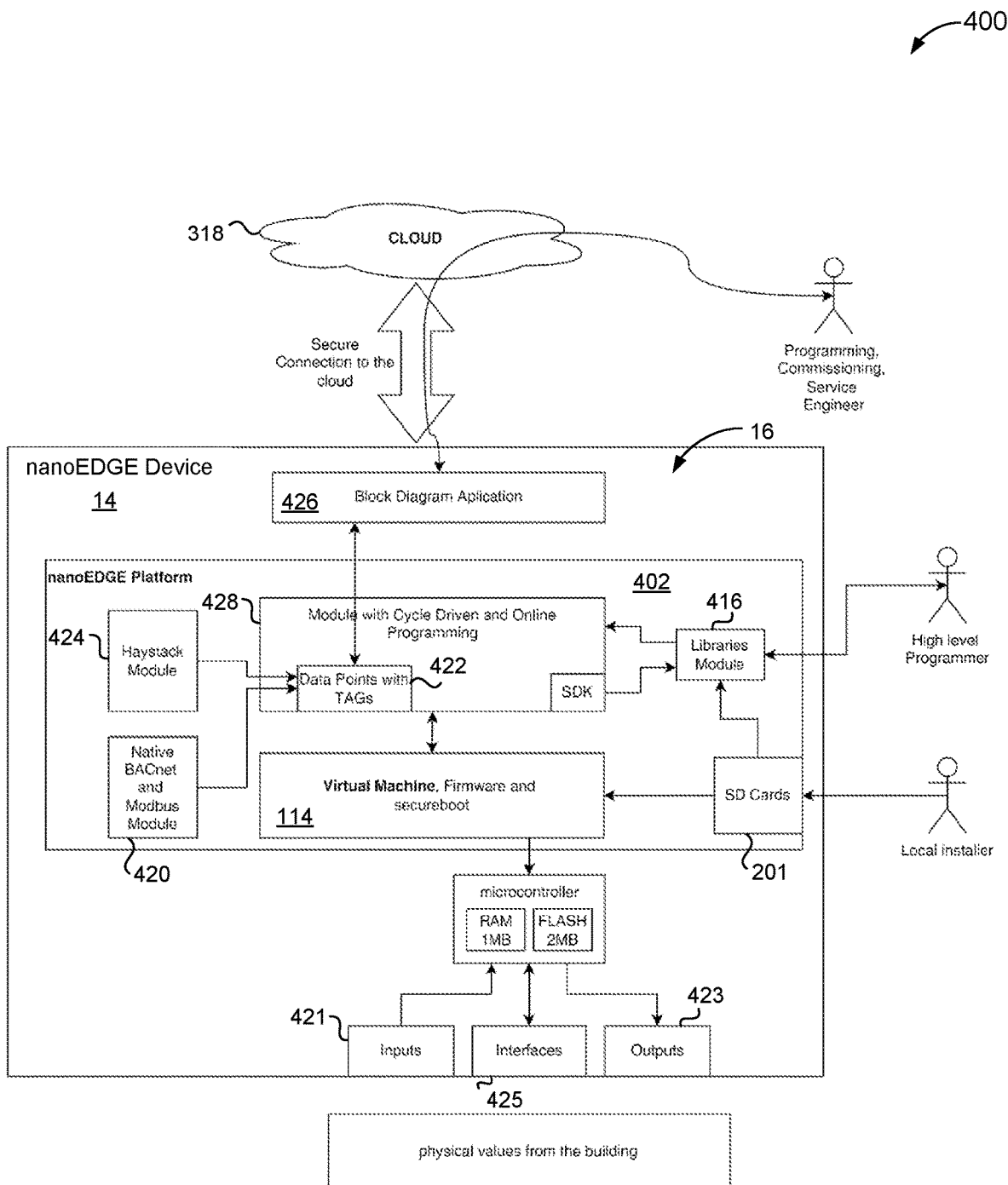

Referring now to FIG. 4, an exemplary schematic view 400 includes the MCU 16 of the infrastructure element 14 (i.e., the nanoEDGE device) as an integrated circuit chip containing one or more processor units/cores, along with memory (program and data) as well as programmable input/output ports to connect to peripherals. The MCU 16 may have, for example, as little as one MB of RAM and two MB of flash memory. Thus, the MCU 16 may be relatively inexpensive compared to a microprocessor with an external environment. The BMS controller 402 operates at the MCU 16 and utilizes the inputs 421, outputs 423, and communication interfaces 425 of the infrastructure element 14 and MCU 16 to receive and transmit signals externally from the infrastructure element 14 or facility environment 10.

Thus, the infrastructure element 14 may communicate (i.e., receive and transmit signals and communications) via input interfaces 421, output interfaces 423, and one or more communication interfaces 425. The communication interfaces 425 provide connections to fieldbus, distributed networks and information and communication technology (ICT) infrastructure (for remote access, programming, etc.). The input interfaces 421 and output interfaces 423 may be digital and/or analog inputs and outputs and may send and receive signals to various peripheral devices of the building infrastructure 10. The infrastructure element 14 may receive analog and digital signals from different kinds of sensors (switches, HMI panels, temperature sensors, movement sensors, occupancy sensors, etc.). The signals may provide data related to user information and physical values within the facility environment 10 to identify needs and current states of the facility environment 10.

With respect to the solar energy system 14c example, the MCU 16 may receive an input indicative of the amount of energy stored by the system and the MCU 16 (such as at the controller 15) may process the input according to a set of parameters (such as based on the current or future energy needs of the facility) to provide an output instructing an unallocated percentage of future captured energy to pass through energy storage into the consumer energy grid 20.

Presence of the BMS controller 402 at the controller 15 of the solar energy system 14c may allow for consideration of the input with respect to other systems in communication with the BMS 100. For example, the BMS 100 may collect energy usage data from each infrastructure element 14 within the facility environment 10 and thus may provide real time usage and updated future projections of energy usage across the facility environment 10 to the controller 15c. The BMS controller 402 (i.e., VM 114) may process the input based on the accumulated data of the BMS 100 and/or the BMS controller 402 may adjust the parameters by which the solar energy controller 15c operates according to the accumulated data and transmit the updated parameters to the controller 15c for controlling operation of the solar energy system 14c. This may allow the solar energy system 14c to operate according to a more accurate representation of the energy needs of the facility environment 10.

The BMS controller 402 may include a BMS communication module 420 to, for example, enable communication with one or more infrastructure elements 14 via native protocols 103, such as BACnet and Modbus. The BMS communication module 420 may also enable the infrastructure element 14 operating the BMS controller 402 to communicate more directly with other devices within the BMS 100 via the native protocols 103. The BMS communication module 420 may translate communications received at and communicated from the BMS controller 402 to the correct protocol 103 or the BMS communication module 420 may recognize a communication as using a given protocol 103 and allow the communication to pass through to the controller 15. The BMS communication module 420 provides built-in native support for functional profiles and network data points implemented directly at the MCU level for popular communication protocols 103. This provides flexibility and openness of the infrastructure element 14 for integration within the BMS 100 with the option of building data points as native. Thus, network variables and their interrelation (e.g., control of one infrastructure element 14 based on operation of another infrastructure element 14) may be built by themselves natively. In other words, the BMS 100 may perform automatic data point definition and automatic configuration of bindings between data points.

The BMS controller 402 may enable processing and standardization of data points related to operation of the infrastructure elements 14 by, for example, accumulating and tagging data points via a tagging module 422. The tagging module 422 may receive data points from the BMS communication interface 420 (where the data may be translated to use a given protocol 103), the VM 114 (such as after processing of the data by the VM 114), or from the input interface 421 of the infrastructure element 14. The tagging module 422 applies tags to received data points for easier sorting and further processing of the data. For example, the tagging module 422 may apply tags supplied from a haystack module 424 whereby the haystack module 424 may provide tags directly from the open tag database Haystack. Thus, the tags applied by the tagging module 422 may standardize semantic data models for web services, making it easier to unlock value from the vast quantity of data produced by the infrastructure elements 14. The tags unify naming and descriptions of data points with the network variables. Thus, the tagged data may be used in communication with other infrastructure elements 14 and devices or for collecting data for the cloud based system 318. This opens the BMS 100 for direct data collection from infrastructure elements 14 based on IoT systems, such as for basic and advanced data analysis (such as AI), optimization, and more effective and dynamic building management systems and solutions.

An interface application 426 provides an interface at which the user 12 may provide instructions 13 for controlling the infrastructure element 14, receive data captured by the infrastructure element 14, create links and bounds between infrastructure elements 14, and the like. In other words, the interface application 426 reflects the BMS controller 402 and the connections between BMS controllers 402 of different infrastructure elements 14 and provides an input interface for the user 12 to monitor and adjust functions of the BMS 100. The interface application 426 can be shown, such as at the remote device 104, as a graphical view of the structure of data connections and function blocks to implement specific control functions. Control functions may be presented in the forms of function blocks, with links to data points that can be extended by an extension block from an internal or external library. The interface application 426 may operate on the infrastructure element 14 or at the remote device 104 or at a device in communication with the BMS 100 through, for example, the cloud-based system 318. Further, the interface application 426 may provide a central programming interface for more than one, such as all, infrastructure elements 14 present in the facility environment 10.

An application module 428 may operate on the BMS controller 402 and is responsible for executing the functions of the BMS controller 402, such as loading libraries, starting basic tasks, and running services. For example, the application module 428 may receive instruction from the interface application 426 and execute the instructions at the infrastructure element 14. The application module 428 is in communication with the VM 114, the BMS communication module 420, the haystack module 424, and optionally a library module 416, and may contain the data tagging module 422. The application module 428 enables the interface application 426 by providing built-in API, communicates and optionally corrects instructions from the interface application 426, remote device 104 or cloud-based system 318. Thus, the application module 428 allows changes in function of the BMS 100, such as creating/removing components at the interface application 426 or adding/removing links between components, to occur without compiling code and the created/removed component in memory space is executed immediately as it is created in memory. Because these changes happen so fast, they may be referred to as real time programming.

The BMS controller 402 may further include a library module 416 that may be populated, updated, and/or adjusted remotely, such as by a high level programmer using a software development kit (SDK). The library module 416 may include new protocol service or new application (logic) components that can be used in the interface application 426 and the SDK may enable integration of the updates provided by the user 12 or library module 416 with the BMS controller 402. The library module 416 may be dynamically loaded from the SD card 201 by the VM 114 during a startup process and may operate within the BMS controller 402.

As discussed above, the BMS controller 402 may be uploaded to the data processing hardware 16 of the infrastructure element 14 from a memory storage device such as SD card 201. The SD card 201 may contain all necessary code and startup files for operating the BMS controller 402 at the infrastructure element 14. That is, all files (firmware code, VM code, libraries, infrastructure element specific configuration, etc.) are stored on the memory storage device (i.e., SD card 201). Uploading the BMS controller 402 from the SD card 201 allows for easy installation and maintenance of the BMS 100 at individual infrastructure elements 14. For example, a new infrastructure element 14 installed within the facility environment 10 may be integrated with the BMS 100 by connecting the data processing hardware 16 of the infrastructure element 14 to the memory storage hardware 201 and allowing the BMS controller 402 to operate on the data processing hardware 16, whereby the BMS controller 402 may utilize communication capabilities (e.g., wireless or wired) of the infrastructure element 14 to connect to the BMS 100. The SD memory card 201 and cloud-based system 318 may collaborate, such as for backup and restoration of data and settings for the infrastructure element 14.

Figure 5:
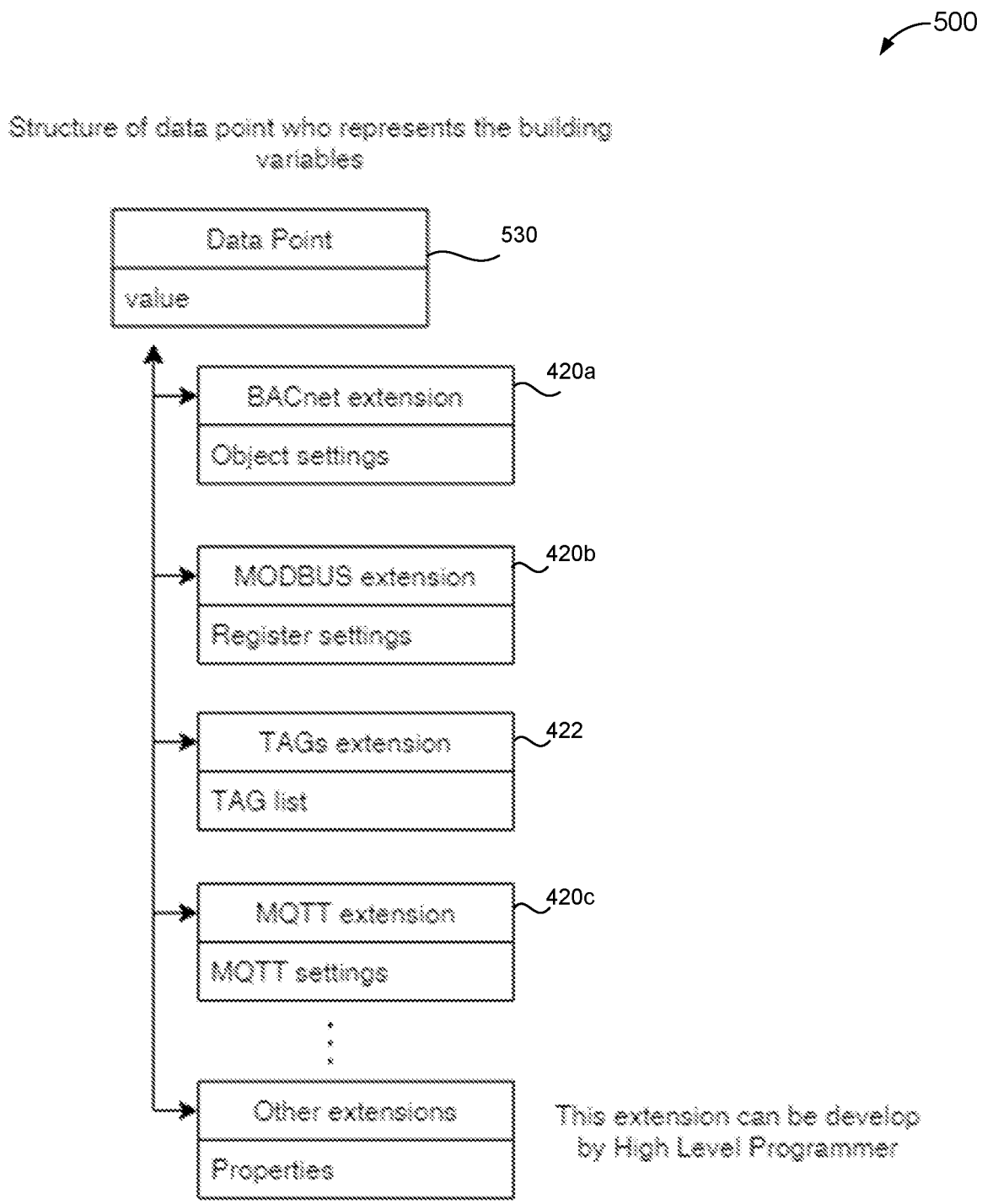
FIG. 5 is a schematic view showing destinations of a data point within the infrastructure management system.

Referring now to FIG. 5, a schematic view 500 depicts exemplary destinations for a data point (i.e., a building variable or parameter). The data point 530 may have a given value or a set of values. For example, the data point 530 may be collected from a sensor in communication with an infrastructure element 14, such as a temperature sensor in communication with the HVAC system 14a, where the data point 530 is related to operation of the infrastructure element 14. In the illustrated embodiment, the data point 530 may be collected and/or transmitted to any suitable extension or module of the BMS controller 402, such as the tagging module 422 for tagging the data point for subsequent accumulation and processing, and one or more communication modules 420, such as a BACnet module 420a, MODBUS module 420b, and MQTT module 420c, to use the data point according to their respective protocols 103.

Figure 6:
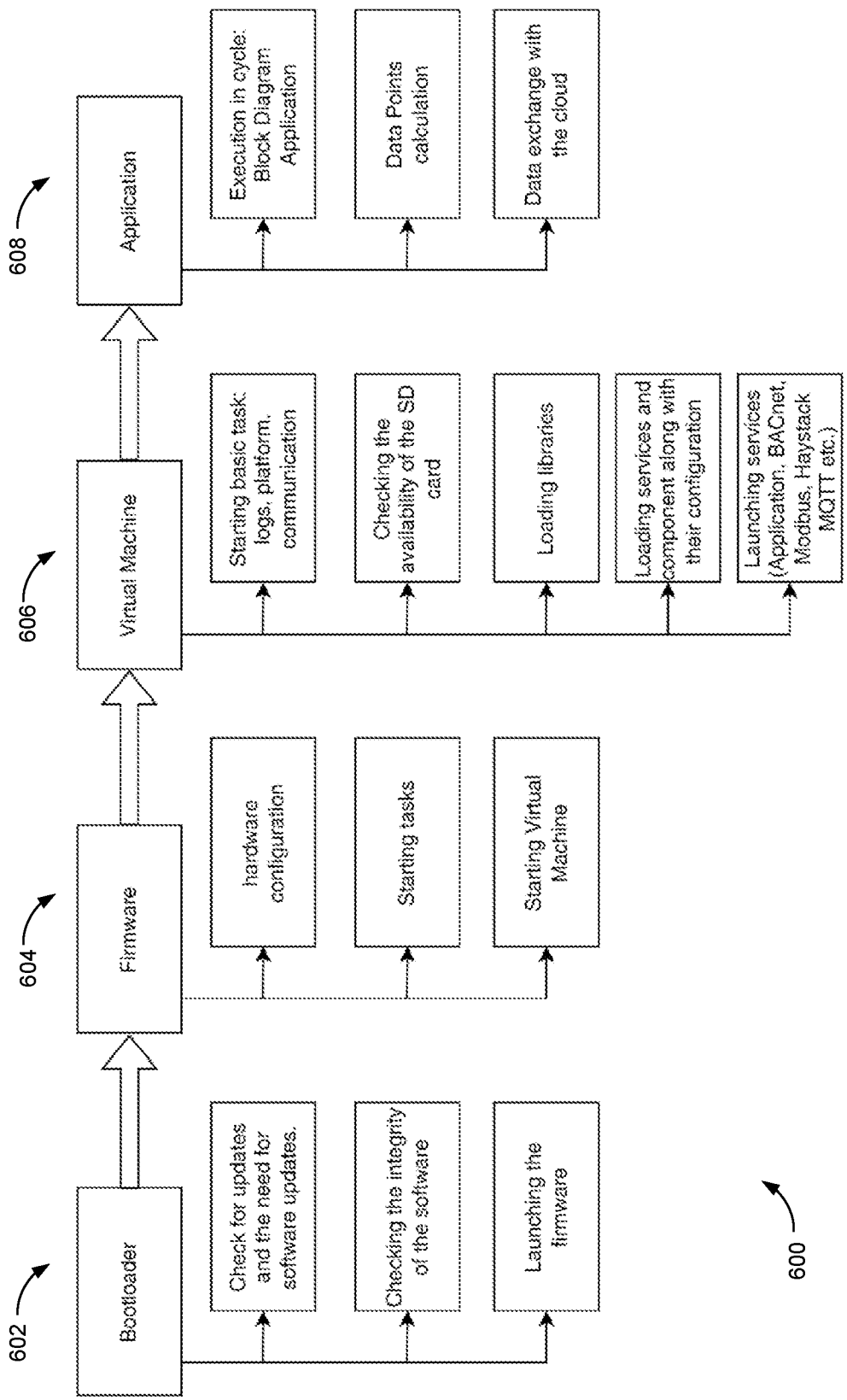
FIG. 6 is a flowchart demonstrating a startup process of the infrastructure element operating the infrastructure management system.

FIG. 6 depicts an exemplary launch process 600 for the interface application 426. The launch process may be divided into four stages. The bootloader launch stage 602 is responsible for checking the availability of updates and, if necessary, updating the firmware and applications for the infrastructure element 14. Then, the bootloader checks the integrity of the software of the BMS 100 (e.g., by checking the digital signatures and decoding the software to be able to run) and then, if possible (i.e., the software has not been tampered with), starts the firmware. The firmware launch stage 604 of starting the software is responsible for hardware configuration (e.g., configuration of IOs, memory, communication interfaces, etc.), starting peripherals (e.g., SD card 201, real-time clock, local inputs and outputs, etc.) and starting the VM 114 with the target application. The virtual machine launch stage 606 launches the target application in the VM 114. The application is written in a high-level language. First, the BMS 100 starts basic services such as the log service, the platform service, and the communication service that allows the user 12 to configure, program (online programming and real time programming) and diagnose the infrastructure element 14 in real time. Next, the BMS 100 checks the availability of the SD card 201. If the SD card 201 is available, then external libraries are loaded from the SD card 201 via the library module 416. The libraries may be provided by the hardware manufacturer or by external high-level developers. Next, the service and component configurations and their connections are loaded from the SD card 201. Services are responsible for communication with the outside world. For example, the BMS communication module 420 and the haystack module 424. In the application stage 608, the interface application 426 is provided. The application 426 is the environment where the end user 12 is allowed to program the logic (i.e., control algorithm). The application 426 runs in cycles, data points are calculated, and the BMS controller 402 may communicate with the cloud-based system 318.

Figure 7:
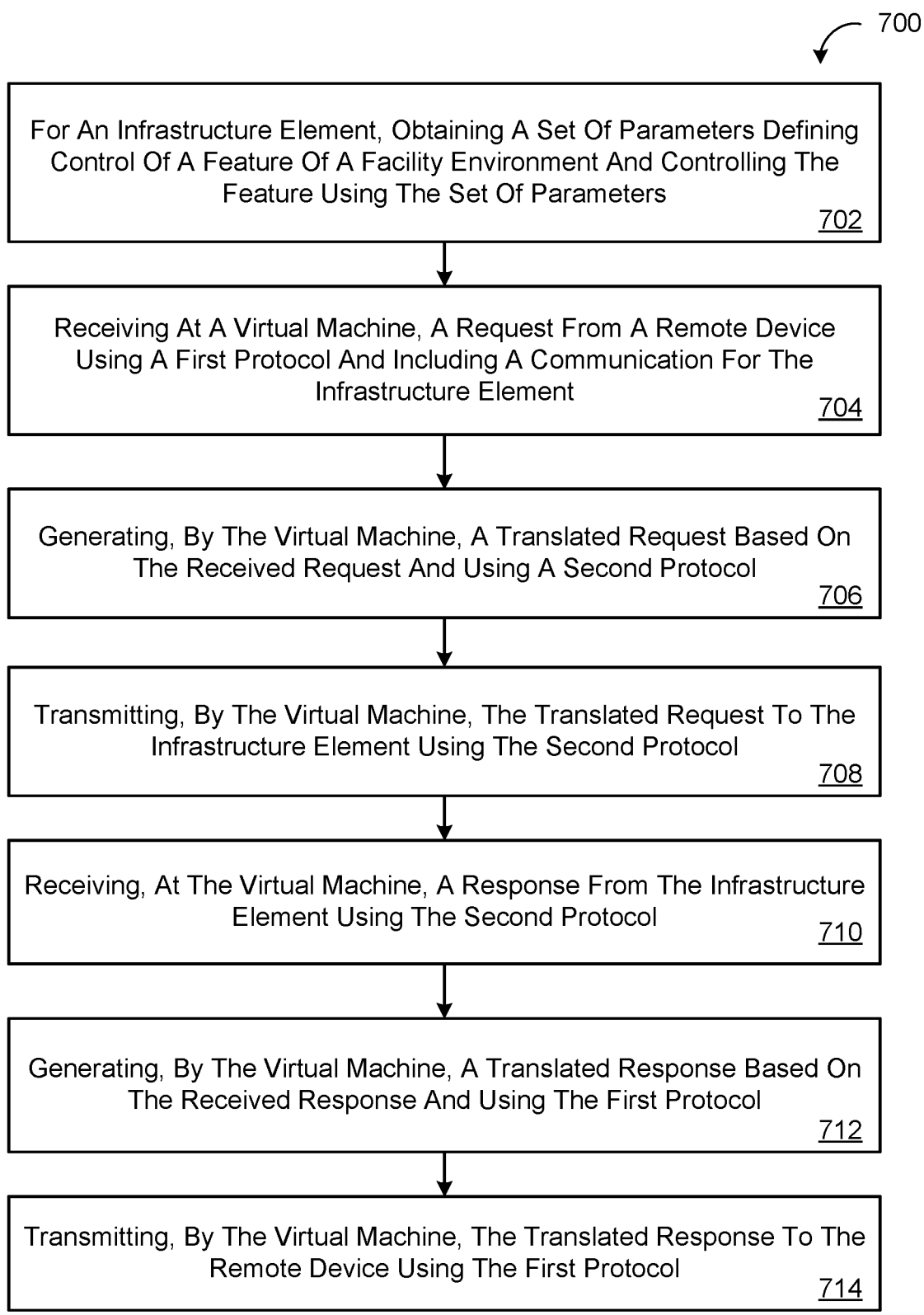
FIG. 7 is a flowchart diagram of a method of controlling operation of an infrastructure element utilizing the infrastructure management system.

FIG. 7 is a flowchart of an example method 700 of operations for controlling operation of an infrastructure element with an infrastructure management system. At operation 702, the operations include, for each respective infrastructure element 14 of a plurality of infrastructure elements, obtaining a set of parameters defining control of a corresponding feature 19 of a facility environment 10 and controlling, using the set of parameters, the corresponding feature 19 of the facility environment 10. At operation 704, the operations include receiving, at a VM 114, a remote device request 106 from a remote device 104. The remote device request uses a first protocol 103 and includes a communication for a first infrastructure element 14 of the plurality of infrastructure elements 14. The communication is associated with control of a first feature 19 of the facility environment 10 corresponding to the first infrastructure element 14. At operation 706, the operations include generating, by the VM 114, a translated request 108 using a second protocol 103. The translated request 108 is based on the remote device request 106. At operation 708, the operations include transmitting, by the VM 114, the translated request 108 using the second protocol 103 to the first infrastructure element 14. At operation 710, the operations include receiving, at the VM 114, from the first infrastructure element 14, an infrastructure element response 110 using the second protocol 103. At operation 712, the operations include generating, by the VM 114, a translated response 112 using the first protocol 103. The translated response 112 is based on the infrastructure element response 110. At operation 714, the operations include transmitting, by the VM 114, to the remote device 104, the translated response 112 using the first protocol 103.

Thus, the BMS 100 provides a complete integrated platform for fully distributed and IoT ready infrastructure elements 14, where microcontroller-based network nodes or elements (e.g., controllers, I/O modules) provide reliable and easy-to-use mechanisms for accessing control of the infrastructure elements 14 via the BMS 100. The microcontroller-based nodes allow for dynamic configuration of operating parameter settings, network communication and inter-relationship of functions and data points (i.e., bindings) between controllers 15 of infrastructure elements 14 for automatic configuration as well as implementation of control and monitoring functions within a platform of the BMS 100. These features allow for remote reprograming of controllers 15 (i.e., network nodes) in real time, enabling both rapid dynamic control changes and control function evolution over time.

The BMS controller 402 includes several elements, including the virtual machine 114, communication module 420, universal tags library module 422, and communication interface 426 ready to communicate with cloud systems 318, which provide support for online device programming, easier integration of the infrastructure element's data points and functions with universal tags as well as effortless device replacement with automatic configuring of device in real time to work within a fieldbus control network. The BMS 100 allows real-time reprogramming of the BMS field-level controllers 15, enabling dynamic and evolutionary adaptation of the control system to changing requirements and environmental conditions. Moreover, the firmware code and device-specific configuration can be stored on a Secure Digital (SD) memory card 201 or another suitable interchangeable memory component as well as in the cloud system 318.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 8:
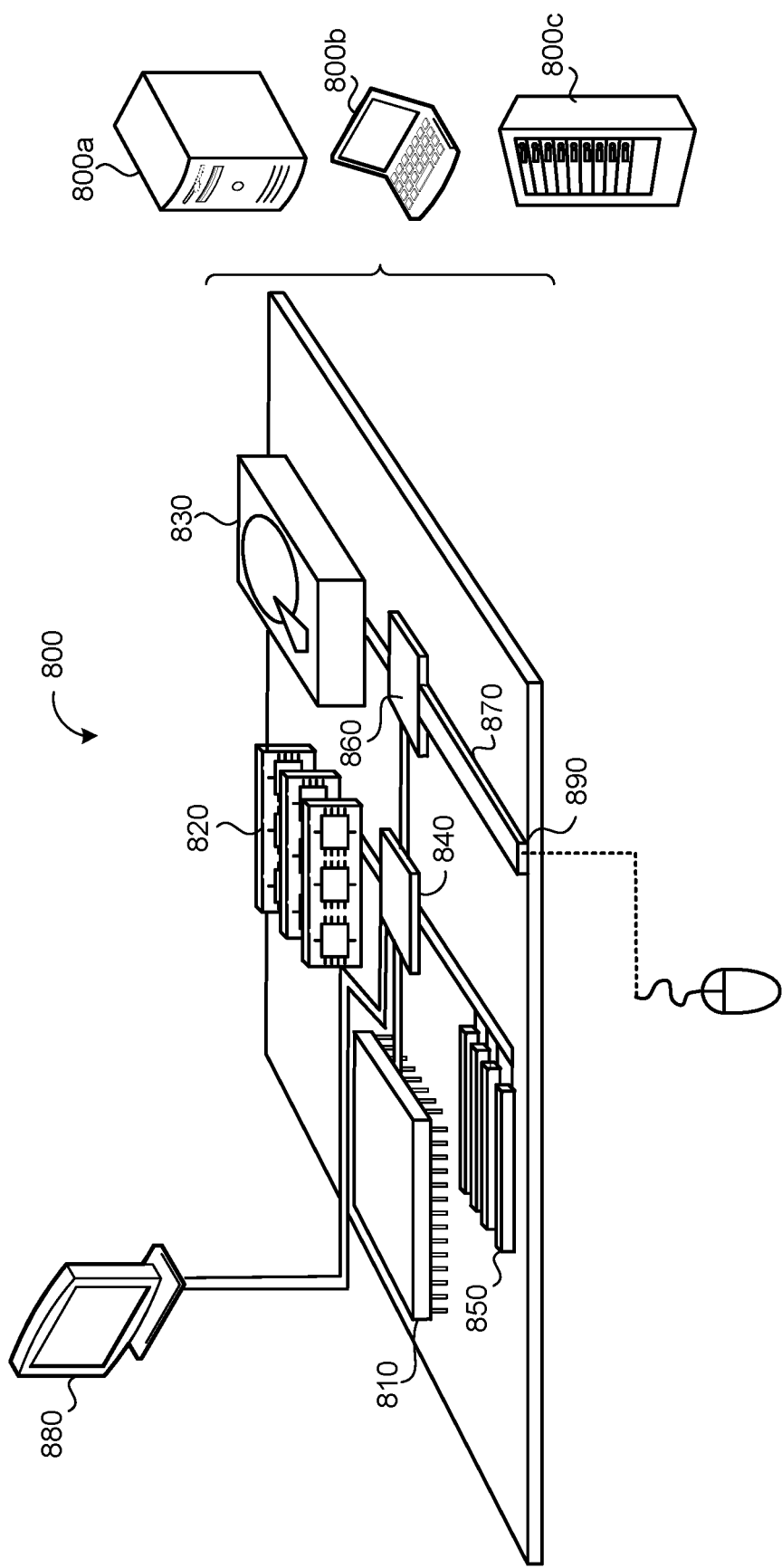
FIG. 8 is a schematic view of an example computing device that may be used to implement the systems and methods described herein.

FIG. 8 is schematic view of an example computing device 800 that may be used to implement the systems and methods described in this document. The computing device 800 is intended to operate on or with the MCU 16 of the infrastructure element 14 and/or may also represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
for each respective infrastructure element of a plurality of infrastructure elements:
obtaining a set of parameters defining control of a corresponding feature of a facility environment; and
controlling, using the set of parameters, the corresponding feature of the facility environment;
receiving, at a virtual machine executing on a first infrastructure element of the plurality of infrastructure elements, a remote device request from a remote device, the remote device request using a first protocol and including a communication for the first infrastructure element of the plurality of infrastructure elements, the communication associated with control of a first feature of the facility environment corresponding to the first infrastructure element;
generating, by the virtual machine, a translated request using a second protocol, the translated request based on the remote device request;
transmitting, by the virtual machine, the translated request using the second protocol to the first infrastructure element;
receiving, at the virtual machine, from the first infrastructure element, an infrastructure element response using the second protocol;
generating, by the virtual machine, a translated response using the first protocol, the translated response based on the infrastructure element response; and
transmitting, by the virtual machine, to the remote device, the translated response using the first protocol.

2. The method of claim 1, wherein:
the communication for the first infrastructure element comprises instructions for the first infrastructure element to adjust control of the first feature of the facility environment based on a second set of parameters; and
the infrastructure element response comprises confirmation that the first infrastructure element has adjusted control of the first feature of the facility environment based on the second set of parameters.

3. The method of claim 1, wherein:
the communication for the first infrastructure element comprises an information request requesting information associated with control of the first feature of the facility environment; and
the infrastructure element response comprises an information response providing the requested information.

4. The method of claim 1, wherein:
a sensor is in communication with the first infrastructure element; and
controlling the first feature of the facility environment is based on sensor data received at the first infrastructure element from the sensor.

5. The method of claim 4, wherein:
the communication for the first infrastructure element comprises an information request requesting information associated with control of the first feature of the facility environment; and
generating the translated response is based on the sensor data received at the first infrastructure element.

6. The method of claim 1, wherein generating the translated response comprises applying a tag to the infrastructure element response.

7. The method of claim 1, wherein:
the virtual machine comprises a first virtual machine in communication with the first infrastructure element and a second virtual machine in communication with a second infrastructure element of the plurality of infrastructure elements; and
the operations further comprise:
receiving, at the second virtual machine, a second remote device request from the remote device, the second remote device request using the first protocol and including a second communication for the second infrastructure element, the second communication associated with control of a second feature of the facility environment corresponding to the second infrastructure element;
generating, by the second virtual machine, a second translated request using a third protocol, the second translated request based on the second remote device request;
transmitting, by the second virtual machine, the second translated request using the third protocol to the second infrastructure element;
receiving, at the second virtual machine, from the second infrastructure element, a second infrastructure element response using the third protocol;
generating, by the second virtual machine, a second translated response using the first protocol, the second translated response based on the second infrastructure element response; and transmitting, by the second virtual machine, to the remote device, the second translated response using the first protocol.

8. The method of claim 7, wherein the second communication associated with control of the second feature of the facility environment comprises instructions to control, by the second infrastructure element, the second feature of the facility environment based on control, by the first infrastructure element, of the first feature of the facility environment.

9. The method of claim 1, wherein the remote device comprises a remote server in wireless communication with each respective infrastructure element of the plurality of infrastructure elements.

10. The method of claim 1, wherein:
the remote device comprises a user interface; and
the remote device request is generated at the remote device based on a user input received at the user interface.

11. The method of claim 1, wherein the data processing hardware comprises a plurality of microcontrollers, each respective microcontroller of the plurality of microcontrollers corresponding to a respective infrastructure element of the plurality of infrastructure elements.

12. The method of claim 11, wherein the virtual machine operates on at least one microcontroller of the plurality of microcontrollers.

13. The method of claim 1, wherein the virtual machine comprises a portion of a system controller, the system controller operated on the data processing hardware, whereby source code for the system controller is stored on memory hardware in communication with the data processing hardware.

14. An infrastructure management system comprising:
data processing hardware; and
memory hardware in communication with the data processing hardware, the memory hardware storing instructions that when executed on the data processing hardware cause the data processing hardware to perform operations comprising:
for each respective infrastructure element of a plurality of infrastructure elements:
obtaining a set of parameters defining control of a corresponding feature of a facility environment; and
controlling, using the set of parameters, the corresponding feature of the facility environment;
receiving, at a virtual machine executing on a first infrastructure element of the plurality of infrastructure elements, a remote device request from a remote device, the remote device request using a first protocol and including a communication for the first infrastructure element of the plurality of infrastructure elements, the communication associated with control of a first feature of the facility environment corresponding to the first infrastructure element;
generating, by the virtual machine, a translated request using a second protocol, the translated request based on the remote device request;
transmitting, by the virtual machine, the translated request using the second protocol to the first infrastructure element;
receiving, at the virtual machine, from the first infrastructure element, an infrastructure element response using the second protocol;
generating, by the virtual machine, a translated response using the first protocol, the translated response based on the infrastructure element response; and
transmitting, by the virtual machine, to the remote device, the translated response using the first protocol.

15. The infrastructure management system of claim 14, wherein:
the communication for the first infrastructure element comprises instructions for the first infrastructure element to adjust control of the first feature of the facility environment based on a second set of parameters; and
the infrastructure element response comprises confirmation that the first infrastructure element has adjusted control of the first feature of the facility environment based on the second set of parameters.

16. The infrastructure management system of claim 14, wherein:
the communication for the first infrastructure element comprises an information request requesting information associated with control of the first feature of the facility environment; and
the infrastructure element response comprises an information response providing the requested information.

17. The infrastructure management system of claim 14, wherein:
a sensor is in communication with the first infrastructure element; and
wherein controlling the first feature of the facility environment is based on sensor data received at the first infrastructure element from the sensor.

18. The infrastructure management system of claim 17, wherein:
the communication for the first infrastructure element comprises an information request requesting information associated with control of the first feature of the facility environment; and
generating the translated response is based on the sensor data received at the first infrastructure element.

19. The infrastructure management system of claim 14, wherein generating the translated response comprises applying a tag to the infrastructure element response.

20. The infrastructure management system of claim 14, wherein:
the virtual machine comprises a first virtual machine in communication with the first infrastructure element and a second virtual machine in communication with a second infrastructure element of the plurality of infrastructure elements; and
the operations further comprise:
receiving, at the second virtual machine, a second remote device request from the remote device, the second remote device request using the first protocol and including a second communication for the second infrastructure element, the second communication associated with control of a second feature of the facility environment corresponding to the second infrastructure element;
generating, by the second virtual machine, a second translated request using a third protocol, the second translated request based on the second remote device request;
transmitting, by the second virtual machine, the second translated request using the third protocol to the second infrastructure element;

receiving, at the second virtual machine, from the second infrastructure element, a second infrastructure element response using the third protocol;

generating, by the second virtual machine, a second translated response using the first protocol, the second translated response based on the second infrastructure element response; and transmitting, by the second virtual machine, to the remote device, the second translated response using the first protocol.

21. The infrastructure management system of claim 20, wherein the second communication associated with control of the second feature of the facility environment comprises instructions to control, by the second infrastructure element, the second feature of the facility environment based on control, by the first infrastructure element, of the first feature of the facility environment.

22. The infrastructure management system of claim 14, wherein the remote device comprises a remote server in wireless communication with each respective infrastructure element of the plurality of infrastructure elements.

23. The infrastructure management system of claim 14, wherein:

the remote device comprises a user interface; and the remote device request is generated at the remote device based on a user input received at the user interface.

24. The infrastructure management system of claim 14, wherein the data processing hardware comprises a plurality of microcontrollers, each respective microcontroller of the plurality of microcontrollers corresponding to a respective infrastructure element of the plurality of infrastructure elements.

25. The infrastructure management system of claim 24, wherein the virtual machine operates on at least one microcontroller of the plurality of microcontrollers.

26. The infrastructure management system of claim 14, wherein the virtual machine comprises a portion of a system controller, the system controller operated on the data processing hardware, whereby source code for the system controller is stored on the memory hardware.

* * * * *